Patented July 27, 1954

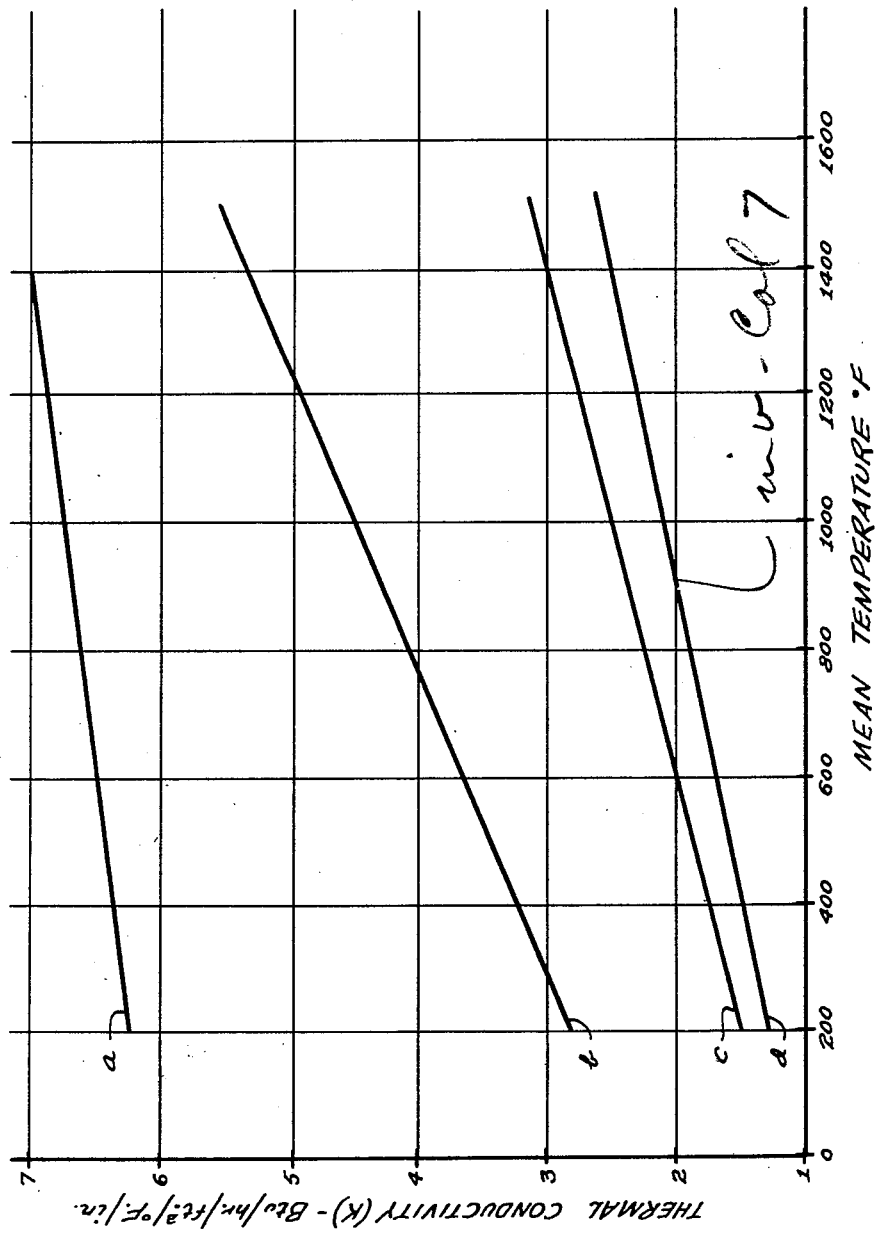

2,684,913

UNITED STATES PATENT OFFICE 2,684,913

REFRACTORIES AND BONDING AGENTS THEREFOR

Richard R. West, Alfred, N. Y., assignor to North American Cement Corporation, Catskill, N. Y., a corporation of Delaware Application January 6, 1951, Serial No. 204,790

8 Claims. (Cl. 106—64)

1

This invention relates to refractories and to bonding agents for such refractories.

It has long been recognized that hydraulic bonding agents such as calcium silicate cements constitute excellent but relatively inexpensive bonding agents for a variety of aggregates and that they serve particularly well as bonding agents for structural concrete. It has also been recognized that hydraulic cements such as calcium silicate cements and more particularly various Portland cements upon being heated to elevated temperatures and then cooled have a tendency to first dehydrate and then rehydrate. This characteristic has placed severe limitations upon the utilization of such hydraulic bonding agents in the production of refractories. It has further been recognized that calcium silicate cements have the disadvantage of being subjected to mineral inversion and resulting expansion at the elevated temperatures now often experienced in refractory furnaces and that this characteristic of calcium silicate cements likewise limits their utilization for bonding refractories. Up to the present time, no known practicable solutions to the stated problem have been offered. As a result, stable refractories containing conventional calcium silicate cements as the principal or sole bonding agent which can be subjected to varied elevated temperatures, say, up to and including temperatures of 3000° F., and even above are not available.

It is an object of this invention to provide a calcium silicate bonding composition for refractories which may be used to form a stable bond for refractories at the higher service temperatures now encountered.

It is a special object of this invention to provide calcium silicate bonding compositions stable at high and low temperatures and stable to wide temperature variations, including both heating and cooling temperatures.

It is another object of this invention to provide stable and inexpensive castable refractories.

It is an additional object of this invention to provide a castable concrete mix composed substantially completely of calcium silicate, which, when formed into a concrete, constitutes a refractory stable over a wide range of service temperatures.

It is still another object of my invention to provide both acid and basic castable refractories having exceptional refractoriness and other improved properties.

Other objectives and purposes of my invention will appear from the more detailed description which follows.

2

I have found that a superior hydraulic bonding agent for refractories meeting the objectives of my invention can be produced from calcium silicate cements by adding to such cements stabilizing quantities of carbonaceous materials which form oxides of carbon at low temperatures and also by adding stabilizing quantities of substantially water-insoluble boron compounds. Such cementitious bonds are stable in refractories subject to service temperatures as high as 3000° F. Where Portland cement clinker is used as an aggregate and service temperatures in excess of 1800° F. are experienced in the use of the refractories, it has been found necessary to add clay or its equivalent as a stabilizing agent for the calcium oxide formed in the cementitious bonds at such temperatures. Where other conventional refractory aggregates are used oxides are usually present in a sufficient quantity to bind the oxide of calcium formed at temperatures above 1800° F. Castable refractories stable at service temperatures as high as 2200° F. can be bonded with calcium silicate cements containing stabilizing quantities of carbonaceous material.

It is well known that most of the refractories are now made of various types of refractory brick, even though castable refractories have known decided advantages over such refractories. This preference for pre-formed refractories is mainly attributable to the superior refractoriness of such materials. At the present time castable refractory aggregates consist either of ground fire brick, ground calcined fire clay, ground high alumina materials including ground high-alumina brick, or fused material. For example, at the present time there is no acid castable suitable for replacing silica refractories, and there are no basic castables capable of replacing basic brick refractories. The failure to provide refractory castables stable to high service temperatures is due to the fact that calcium aluminate cements heretofore used in forming refractories subjected to high service temperatures have extremely low fusion temperatures in the presence of such acid or basic materials. As the result of my discovery, I have now provided castable refractories containing basic aggregates such as fired cement clinkers or acid aggregates such as fire brick or high alumina brick having superior refractoriness and other improved properties, such as stability to heating and cooling.

A castable refractory can be used to advantage to replace loose dolomite or magnesite clinker that is now used for a monolithic hearth in the basic open hearth furnace. Such castable presents a more impenetrable surface to the attack of molten metal than does the present loose clinker installation. There are many other applications that arise where a basic castable might be desirable if the fusion temperature is sufficiently high to allow a sufficiently high service temperature.

Due to the fluidity of castable refractories, much time and skilled labor is saved by casting them at the place where they are used. Castable refractories are versatile in methods of application as they may be puddled into forms in a manner similar to the way concrete is used. They may be rammed into forms or molds using a comparatively dry mixture with water by hand hammering or an air hammer. They may be applied by cement-gun methods in which the dry material is blown through a nozzle at which time water is added to the mixture thus making it stick to a wall. The latter method is used extensively for castable linings of stacks or chimneys and in patching refractory walls.

In the production of my novel castable refractories I may use from 95 to 50% by weight of the refractory aggregate and from about 5 to 50% by weight of the calcium silicate bonding agent. In general, I prefer to encompass a major proportion of the refractory aggregate in my castables and generally use approximately 60% to 90% by weight of the aggregate. An especially valuable castable refractory is obtained by using about 70% by weight of burned Portland cement clinker containing about equal quantities of clinker crushed to a fineness of 8–30 mesh containing a minimum of fines, together with uncrushed clinker of conventional size, i. e. varying from ¾ to ⅛" in diameter.

The stabilizing agents used in my calcium silicate bonding compositions may be varied over a considerable range, depending, in part at least, on the amount of aggregate used and on the service temperatures encountered. The carbon material used to stabilize the cement against dehydration and rehydration at service temperatures up to approximately 1800° F. is present in a quantity by weight providing carbon in a percentage varying from about 0.4% to 20% based upon the amount of calcium silicate cement used. Boron compounds are usually present in a quantity by weight delivering $B_2O_3$ in a percentage varying from about 0.02% to about 4% based upon the quantity of calcium silicate cement present. The finely ground clay when necessary in my composition is present in a quantity varying from about 4% to about 60% by weight based upon the weight of the calcium silicate cement present. Higher percentages of clay usually lower the refractoriness of the cement to a point where it is no longer useful.

A typical class of calcium silicate bonding compositions of my invention would contain the following parts by weight:

| | Parts |
|---|---|
| Pulverized Portland cement clinker | 25 |
| Carbon material (added in quantities to give the following parts by weight of carbon) | 0.1 to 5 |
| Boron-containing substance (added in water-insoluble form in quantities to give the following parts by weight of $B_2O_3$) | 0.005 to 1 |

Another typical class of calcium silicate bonding compositions would contain the following parts by weight:

| | Parts |
|---|---|
| Pulverized Portland cement clinker | 25 |
| Carbon material (added in quantities to give the following parts by weight of carbon) | 0.1 to 5 |
| Boron-containing substance (added in water-insoluble form in quantities to give the following parts by weight of $B_2O_3$) | 0.005 to 1 |
| Finely ground clay | 1 to 15 |

The bonding compositions described above are normally mixed with a refractory aggregate present in a major proportion by weight. However, the refractory aggregate may be present in parts by weight varying from about 1 to 20 parts per 1 part of the calcium silicate bonding composition.

The calcium silicate cement used in my bonding compositions and castable refractories is preferably a pulverized Portland cement clinker advantageously ground to a specific surface area of 1200 to 2200 sq. cm. surface area per gram. Either type I or type II Portland cement clinker as described in American Society of Testing Materials Designation C150–49 which has been hard-burned is most useful for forming my calcium silicate type cement. Other types of Portland cement, namely, types III, IV, and V may be used to somewhat less advantage. Other types of calcium silicate cements such as Portland-blast furnace slag cement, pozzuolan cement, true pozzuolanic cement, slag cement, and natural cement, may also be used in my calcium silicate bonding compositions, but they have no advantages over the more economical pulverized Portland cement clinker.

The Portland cement clinker used as a refractory aggregate may be any of the types previously described. Type I and type II which have been hard burned are also preferred as aggregates. A mixture of about 30 parts by weight of unground Portland cement clinker ranging from ¾ to ⅛" in diameter combined with about 38 parts of Portland cement clinker ground to from 8 to 30 mesh when combined with my calcium silicate bonding composition constituted a dense concrete mix of superior properties.

Where it is desired to make a basic castable refractory of unusually high refractoriness, it is best to use various types of magnesite. A calcined magnesite ground to a fineness of 8 to 30 mesh with a minimum of fines through a 30-mesh screen is particularly advantageous. A typical commercial magnesite of this type is known by the designation of Chewelah magnesite. When using such magnesite as aggregates no advantage was obtained by using a mixture of ground and unground materials. Other magnesites may be used with equal advantage as aggregates, such as fused magnesite or periclase, but such materials are usually uneconomical. Other known basic refractory aggregates heretofore used, such as dolomitic clinker, chromite, and ground basic brick may likewise be used in place of the calcined magnesite with substantially equal results.

The carbon material used in my bonding compositions and refractories may be any carbonaceous material which oxidizes to carbon monoxide or carbon dioxide on heating to temperatures up to 1800° F. Under such conditions the oxides of carbon are believed to combine with the calcium oxide formed on dehydration forming calcium carbonate, which does not rehydrate when the refractory is cooled. Preferred materials oxidize at temperatures above 242° F. but below 800° F. Various types of lamp blacks or carbon blacks such as are used for pigments and in the rubber industry have been found advantageous since they may be easily and thoroughly dispersed in the cementitious bond. Certain types of lamp black have superior stabilizing properties. Graphite, either in crystalline or amorphous form, and coal or coke may also be used. The carbonaceous material should not be used in a quantity which will weaken the structure of the refractory through the formation of excessive porosity. The foregoing carbonaceous materials all contain carbon in a chemically uncombined state, and it will be understood that "carbonaceous material" or "carbonaceous substance," as used herein, refers to materials or substances containing carbon in a chemically uncombined state.

In the compositions of my invention, it is only necessary to use boron compounds in a quantity which prevents the mineral inversion of the dicalcium silicate from the beta to the gamma form. It is neither necessary nor advantageous to have the boron compound present in a quantity which through fusion forms a vitreous bond at temperatures substantially lower than those often experienced in modern refractories. Substantially water-insoluble boron materials found suitable may be in amorphous or glassy state. The boron compounds used in my compositions must be substantially insoluble in water and in the concrete mixes in order that the presence of such compounds not impair the set or strength of the refractories. Such materials as Pyrex glass containing 13% or more of $B_2O_3$ and other materials with varying percentages of $B_2O_3$ which are water-insoluble may be used. Crystalline compounds such as $CaO.B_2O_3$, $2CaO.B_2O_3$, $3CaO.B_2O_3$, $5CaO.B_2O_3.SiO_2$, $CaO.B_2O_3.2SiO_2$ may be used. Other substantially water-insoluble compounds providing boron at temperatures above 1800° F. known commercially may be used. Water-insoluble boron compounds containing from 20% to 40% $B_2O_3$ not only prevented mineral inversion, but also had little or not effect on the set of the cement. Typical commercially available water-insoluble boron compounds are shown hereinbelow.

Frits manufactured by the Ferro Enamel Company containing boron

| | | | | | | |
|---|---|---|---|---|---|---|
| #3195 | Na₂O | .311 | Al₂O₃ | .405 | SiO₂ | 2.76 |
| | CaO | .689 | B₂O₃ | 1.10 | | |
| #3124 | Na₂O | .256 | Al₂O₃ | .279 | SiO₂ | 2.645 |
| | K₂O | .016 | B₂O₃ | .497 | | |
| | CaO | .728 | | | | |
| #3373 | PbO | .2873 | Al₂O₃ | .144 | SiO₂ | 1.581 |
| | Na₂O | .2717 | B₂O₃ | .365 | | |
| | K₂O | .0573 | | | | |
| | CaO | .3837 | | | | |
| #3428 | PbO | .0918 | Al₂O₃ | .266 | SiO₂ | 4.935 |
| | Na₂O | .1222 | B₂O₃ | 1.8525 | | |
| | K₂O | .1595 | | | | |
| | CaO | .6265 | | | | |

Frits manufactured by Pemco Corporation, Eastern and Pemco Avenues, Baltimore, Maryland, containing boron

| | | | | | | |
|---|---|---|---|---|---|---|
| P238 | K₂O | .270 | Al₂O₃ | 1.088 | SiO₂ | 4.64 |
| | CaO | .780 | B₂O₃ | 3.060 | | |

Frits manufactured by The Exolon Company containing boron

EXOFRIT

| | Per cent |
|---|---|
| Flint | 45 |
| Boric acid | 40 |
| Lithium carbonate | 15 |

The oxides needed to react with lime formed in my cementitious bonding agents at temperatures above 1800° may be provided and are generally provided in conventional refractory aggregates. Where fired Portland cement clinkers are used as aggregates it is necessary to add oxides which react with lime formed at the stated higher temperatures. Finely ground clay is inexpensive and serves well to bind any lime formed since the oxides of such clays begin to react with calcium oxide at temperatures as low as 1500° F. Other finely divided refractory material containing oxides reactive with calcium oxide which may readily be dispersed in the calcium silicate cement composition may be used also.

The following examples in which the parts are expressed as parts by weight constitute illustrative embodiments of my invention.

EXAMPLE 1

| | Parts by weight |
|---|---|
| Pulverized calcium silicate type cement clinker | 25 |
| Carbon material (added to give the following parts by weight of carbon) | 1 |
| Boron-containing substance (introduced in a water insoluble form to give the following parts by weight of $B_2O_3$) | 0.04 |

The bonding agent of this example can be used to produce a refractory castable which is stable at 3000° F. A typical castable refractory would contain one part of the bonding agent of this example with 2 to 4 parts of an aggregate such as calcined magnesite or ground magnesite brick. Such a refractory castable has a fusion point well over 3000° F. Where a chemically basic character is important in the refractory material, other basic materials such as forsterite, chromite, stabilized dolomitic clinker, or periclase may be used in place of the magnesite.

EXAMPLE 2

| | Parts by weight |
|---|---|
| Pulverized calcium silicate type cement clinker | 25 |
| Carbon material (added to give the following parts by weight of carbon) | 1 |
| Boron-containing substance (introduced in a water insoluble form to give the following parts by weight of $B_2O_3$) | 0.04 |
| Finely ground clay | 5 |

The bonding agent of this example may be used with a calcium silicate clinker as an aggregate and yet remain stable at high service temperatures. Typical refractory castable compositions would contain one part of the calcium silicate bonding agent of this example with two to three parts by weight of Portland cement clinker.

EXAMPLE 3

| | Per cent |
|---|---|
| Pulverized Portland cement clinker | 25 |
| Globe Black* | 1 |
| Borate Frit 3195 (Ferro Enamel Co.) | 1 |
| Calcined Chewelah magnesite | 73 |

* A lamp black manufactured by the L. Martin Company, Inc., 41 East 42 Street, New York 17, N. Y.

This example constitutes a typical basic refractory stable at exceptionally high service temperatures. For instance, the castable refractory of this example has a pyrometric cone equivalent (PCE) above cone 30 which represents a service temperature of at least 3002° F. Additionally, a cast refractory material made from the refractory castable of this example is not attacked by basic slag such as Portland cement clinker when in contact with it at temperatures of 2800° F. The castable of this example is not only stable at high service temperatures, but also remains stable after repeated heating and cooling. The problem of instability resulting from hydration after heating and cooling or dusting after heating and cooling of such castables known heretofore has apparently been solved.

EXAMPLE 4

|  | Per cent |
|---|---|
| Pulverized Portland cement clinker | 25 |
| Globe Black | 1 |
| Borate Frit 3195 (Ferro Enamel Co.) | 1 |
| Finely ground clay | 5 |
| Portland cement clinker | 68 |

Substantial advantages flow from the fact that the aggregate and the bond used in this castable are the same. The cast refractory material made from the compositions of this invention possessed high strength and exceptionally fine thermal insulating properties. The superior insulating properties of refractory material made from the composition of this example are illustrated in the accompanying graph. In the graph the thermal insulating properties of a cast refractory made from the compositions of this example are compared with light-weight insulating refractories of much less strength which have heretofore been considered necessary to produce refractories of good insulating qualities. In the graph the mean temperatures are plotted along the abscissa and the thermal conductivity (K) expressed in B. t. u.'s per hour per square foot of area per degree F. of temperature variation per inch of thickness of the refractory is plotted along the ordinate. In the graph, line $a$ represents the thermal conductivity of a refractory castable made from ground fire brick and bonded together with a calcium aluminate (Luminite) cement. Line $b$ represents the thermal conductivity of a typical insulating refractory made from ground insulating refractory brick bound together with a calcium aluminate cement. Line $c$ represents the thermal conductivity of an insulating refractory brick stable at 2800° F. also bonded with a calcium aluminate cement. Line $d$ represents the thermal conductivity or insulating properties of a cast refractory made from the composition of this example.

Cast refractory materials made from the compositions of this example containing the stabilizing agents Globe Black, Borate Frit 3195, and finely ground clay were compared also with cast refractories not containing such ingredients. Cast test samples made with the castable without the stabilizing agents disintegrated after heating to 2300° F. and then cooling to room temperatures. Such disintegration apparently is due to hydration of the lime in contact with the moisture of the air. Like samples of the castable refractory without the stabilizing agents disintegrated to a fine powder when heated above 2300° F. and then cooled below 1250° F. The powdering of the cast product not containing the stabilizing agents is believed to be attributable to the mineral inversion of the dicalcium silicate content of the cement. Cast samples made from the castables of this example remained stable under identical conditions to those just described.

EXAMPLE 5

|  | Per cent by weight |
|---|---|
| Type III Portland cement | 25 |
| Finely ground clay | 5 |
| 3195 borate frit | 1 |
| Globe Black | 1 |
| 8–30 mesh Portland cement clinker | 38 |
| Unground Portland cement clinker | 30 |

The castable of this example was used to manufacture experimental preformed chimney blocks and cast maple sugar hearths. The experimental installations have operated over a sufficiently long period of time to demonstrate the practical utility of such cast materials.

EXAMPLE 6

|  | Percent by weight |
|---|---|
| Pulverized type I hard-burned Portland cement clinker | 25 |
| Finely ground clay | 5 |
| 3195 borate frit | 1 |
| Globe Black | 1 |
| 8–30 mesh Portland cement clinker | 38 |
| Unground Portland cement clinker | 30 |

EXAMPLE 7

|  | Percent by weight |
|---|---|
| Pulverized type II hard-burned Portland cement clinker | 25 |
| Finely ground clay | 5 |
| 3195 borate frit | 1 |
| Globe Black | 1 |
| 8–30 mesh Portland cement clinker | 38 |
| Unground Portland cement clinker | 30 |

The castables of the two foregoing examples have been used experimentally as flue blocks in a clamp kiln for firing building bricks, as carburetor covers for water gas generators, as a wall section of the ash hopper of an oil-fired steam boiler, and as a complete lining for a ten foot laboratory rotary kiln. The experimental installations have proven to be completely stable under the stated severe service evaluations.

EXAMPLE 8.—REFRACTORY CASTABLE

|  | Percent by weight |
|---|---|
| Pulverized Portland cement clinker | 25 |
| Globe Black (L. Martin Company) | 1 |
| Ground fire brick | 74 |

EXAMPLE 9.—REFRACTORY CASTABLE

|  | Percent by weight |
|---|---|
| Pulverized Portland cement clinker | 25 |
| Globe Black (L. Martin Company) | 1 |
| Finely ground clay | 5 |
| Portland cement clinker | 69 |

The castables of the two preceding examples are stable at service temperatures up to 2200° F. while similar products without the carbonaceous materials disintegrated after heating to temperatures of 2200° F., or even in some instances, after heating to temperatures as low as 800° F.

It will be apparent, also, that ground magnesite or chrome brick, ground calcined fireclay, calcined magnesite or other aggregates common in the manufacture of refractory castables may be used instead of the Portland cement aggregate or the ground fire brick.

It will be understood that the foregoing examples constitute illustrative embodiments of my invention and that various modifications and changes can be made therein without departing from the spirit of my invention or the scope of the appended claims.

I claim:
1. A heat stable hydraulic bonding composition comprising a calcium silicate cement stabilized by a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with refractory aggregates.

2. A heat stable hydraulic bonding composition comprising a calcium silicate cement stabilized by a carbon material present in a quantity by weight varying from about 0.4 to 20% of said cement, by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with refractory aggregates, and by clay present in a quantity by weight varying from about 4 to 60% of said cement.

3. A heat stable hydraulic bonding composition comprising Portland cement ground to a surface area of about 1200 to 2200 square centimeters of surface area per gram stabilized by the presence of a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with refractory aggregates.

4. A stable refractory castable composition comprising a basic refractory aggregate and a hydraulically hardenable bonding composition therefor comprising a calcium silicate cement stabilized by a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with said aggregate.

5. A stable refractory castable composition comprising an acid refractory aggregate and a hydraulically hardenable bonding composition therefor comprising a calcium silicate cement stabilized by a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with said aggregate.

6. A castable refractory composition comprising a Portland cement clinker aggregate and a hydraulically hardenable bonding composition therefor comprising a calcium silicate cement stabilized by a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with said aggregate.

7. A stable castable refractory composition comprising a Portland cement clinker aggregate composed of approximately equal quantities of unground Portland cement clinker and Portland cement clinker ground to a fineness of 8–30 mesh, and a hydraulically hardenable bonding composition therefor comprising a calcium silicate cement stabilized by a carbon material present in a quantity by weight varying from about 0.4 to 20% of said cement, by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with said aggregate, and by clay present in a quantity by weight varying from about 4 to 60% of said cement.

8. A refractory material comprising a refractory aggregate bonded together by a hydraulically hardened Portland cement stabilized by a carbon material present in a quantity by weight varying from about 0.4 to 20% of said cement, and by a quantity of a substantially water-insoluble boron-containing substance present in a quantity delivering $B_2O_3$ in an amount by weight equal to at least 0.02% of said cement but delivering $B_2O_3$ in a quantity insufficient to form a vitreous bond with said aggregate.

References Cited in the file of this patent

UNITED STATES PATENTS

| Number | Name | Date |
|---|---|---|
| 43,548 | Held | July 12, 1864 |
| 112,929 | Kreischer | Mar. 21, 1871 |
| 1,852,595 | Steinour | Apr. 5, 1932 |
| 1,867,641 | Witty | July 19, 1932 |
| 2,083,180 | Work | June 8, 1937 |

FOREIGN PATENTS

| Number | Country | Date |
|---|---|---|
| 5,033 | Great Britain | 1881 |
| 21,997 | Great Britain | 1891 |
| 4,632 | Great Britain | 1894 |
| 4,298 | Great Britain | 1902 |
| 28,731 | Great Britain | 1903 |
| 10,792 | Switzerland | 1895 |